(12) United States Patent
Ivarsson et al.

(10) Patent No.: US 12,115,816 B2
(45) Date of Patent: *Oct. 15, 2024

(54) WHEEL LOCK WITH CENTRAL EXPANDER

(71) Applicant: Rimgard Sweden AB, Solna (SE)

(72) Inventors: Lars Ivarsson, Solna (SE); Carl Pettersson, Solna (SE)

(73) Assignee: Rimgard Sweden AB, Solna (SE)

( * ) Notice: Subject to any disclaimer, the term of this patent is extended or adjusted under 35 U.S.C. 154(b) by 904 days.

This patent is subject to a terminal disclaimer.

(21) Appl. No.: 16/972,434

(22) PCT Filed: Mar. 26, 2019

(86) PCT No.: PCT/EP2019/057637
§ 371 (c)(1),
(2) Date: Dec. 4, 2020

(87) PCT Pub. No.: WO2019/233649
PCT Pub. Date: Dec. 12, 2019

(65) Prior Publication Data
US 2021/0229489 A1    Jul. 29, 2021

(51) Int. Cl.
*B60B 3/16*       (2006.01)
*B60B 7/00*       (2006.01)
(Continued)

(52) U.S. Cl.
CPC ............... *B60B 7/16* (2013.01); *B60B 3/165* (2013.01); *B60B 7/0013* (2013.01); *B60B 7/04* (2013.01);
(Continued)

(58) Field of Classification Search
CPC ......... B60B 7/16; B60B 3/165; B60B 7/0013; B60B 7/04; B60B 7/066; B60B 2320/16; B60B 2900/3318; B60B 7/068
See application file for complete search history.

(56) References Cited

U.S. PATENT DOCUMENTS 2,012,735 A    8/1935   Swartz
2,124,035 A *  7/1938   Hurd .................... B60B 23/06
                                                  292/6

(Continued)

FOREIGN PATENT DOCUMENTS

EP    0119624 A2    9/1984
EP    0883500 A1    12/1998
(Continued)

OTHER PUBLICATIONS

First Examination Report, dated Jun. 24, 2022, received in connection with corresponding IN Patent Application No. 202127000440 (with English translation), 4 pages.

(Continued)

*Primary Examiner* — Kristina R Fulton
*Assistant Examiner* — Thomas L Neubauer
(74) *Attorney, Agent, or Firm* — Koivula & Somersalo, LLC

(57) ABSTRACT

A main module adapted to be attached to a wheel of a vehicle is disclosed, comprising a centre bolt, an expander and a locking mechanism. The main module is configured to be fitted with a blocking means configured to cover nuts or bolts of the wheel. The centre bolt is adapted to be connected to the main module by means of a threading such that the axial position of the centre bolt, as seen along the axis of rotation of the wheel, can be adjusted by rotating the centre bolt relative the main module, and such that the expander expands in a radial direction of the wheel as the axial position of the centre bolt is adjusted. The expander is thereby allowed to engage with the wheel to secure the module to said wheel.

11 Claims, 14 Drawing Sheets

(51) Int. Cl.
*B60B 7/04* (2006.01)
*B60B 7/06* (2006.01)
*B60B 7/16* (2006.01)

(52) U.S. Cl.
CPC .......... *B60B 7/066* (2013.01); *B60B 2320/16* (2013.01); *B60B 2900/3318* (2013.01)

(56) References Cited

U.S. PATENT DOCUMENTS

| | | | |
|---|---|---|---|
| 2,217,775 | A | 10/1940 | Smith |
| 2,363,567 | A | 11/1944 | Blakeman |
| 2,568,370 | A | 9/1951 | Scuderi |
| 2,659,229 | A * | 11/1953 | Skillman ................. B60B 7/16 70/32 |
| 2,807,157 | A | 9/1957 | Mclin |
| 3,995,461 | A | 12/1976 | Hudson |
| 4,825,669 | A | 5/1989 | Herrera |
| 5,410,897 | A | 5/1995 | Edmondson |
| 5,636,905 | A | 6/1997 | Pagacz |
| 5,931,516 | A * | 8/1999 | Holtman ............... E05B 65/006 411/525 |
| 6,419,326 | B1 | 7/2002 | Rains |
| 8,733,140 | B2 | 5/2014 | Jones |
| 8,739,585 | B2 | 6/2014 | Sims |
| 8,943,865 | B1 | 2/2015 | Bullock et al. |
| 9,120,446 | B2 | 9/2015 | Thomas et al. |
| 9,689,180 | B2 * | 6/2017 | Ivarsson ................. E05B 77/44 |
| 9,809,055 | B2 * | 11/2017 | Hickey ............... E05B 63/0052 |
| 10,046,597 | B2 * | 8/2018 | Wang ........................ B60B 7/04 |
| 10,486,461 | B1 | 11/2019 | Ivarsson |
| 2004/0112101 | A1 | 6/2004 | Labuschagne |
| 2008/0127691 | A1 | 6/2008 | Castillo |
| 2014/0077582 | A1 | 3/2014 | Sims |
| 2014/0157841 | A1 | 6/2014 | Thomas |
| 2015/0143859 | A1 | 5/2015 | Beck, Jr. |
| 2015/0251488 | A1 | 9/2015 | Hoff |
| 2018/0065408 | A1 | 3/2018 | Wang |

FOREIGN PATENT DOCUMENTS

| | | |
|---|---|---|
| GB | 2046185 A | 11/1980 |
| JP | 54-109201 | 8/1979 |
| JP | 59-19003 | 1/1999 |
| JP | 62-175201 | 1/1999 |
| WO | 1997031791 A1 | 9/1997 |

OTHER PUBLICATIONS

Translated Office Action from corresponding Brazilian Application No. 11 2020 024810 0, 4 pages, dated Jan. 9, 2023.
Decision to Grant from corresponding Japanese Patent Application No. 2020-568363, dated Jan. 27, 2023.
International Search Report and Written Opinion from corresponding International Patent Application No. PCT/SE2016/0510877, 9p, dated Jun. 27, 2019.

* cited by examiner

WHEEL LOCK WITH CENTRAL EXPANDER

PRIORITY

This application is a U.S. national application of the international application number PCT/EP2019/057637 filed on Mar. 26, 2019 and claiming priority of an international application number PCT/EP2018/064731 filed on Jun. 5, 2018, the contents of all of which are incorporated herein by reference.

TECHNICAL FIELD

The present disclosure relates to a technology for preventing unauthorized removal of car wheels. More specifically, a universal comprehensive locking system for car wheels is disclosed.

BACKGROUND

Unauthorized removal of car parts, specifically alloy wheels, is a frequently occurring problem all over the world. Due to their high value, custom wheels and tire rims are examples of items frequently stolen. Accordingly, there is a great need for devices and techniques for protecting wheels from unauthorized removal.

There have been attempts to provide such protection. For example, US patent numbers U.S. Pat. Nos. 8,739,585 and 8,943,865 disclose antitheft devices for car wheels. These devices can be removed relatively easily by an experienced thief and thus do not provide a truly reliable wheel lock. U.S. Pat. No. 9,689,180 issued to the inventor of this application provides a device that provides secure wheel lock. However, the device has a multitude of parts and needs to be modified to fit to various car wheels. Considering the great variety of car makes and models all over the world, there is a need for an improved wheel lock system that fits, without substantial adjustments, to most car wheels.

SUMMARY

It is an object of this invention to provide a technology fitting to a majority of car wheels to prevent unauthorized removal of the wheels.

Hence, according to a first aspect, a main module adapted to be attached to the wheel of a vehicle is provided. The module comprises a centre bolt, an expander and a locking mechanism. The main module is configured to be fitted with a blocking means configured to cover nut or bolt by which the wheel is attached to the vehicle. The blocking means may be provided as a separate item, such as for example a dish-shaped cover that can be arranged over a nut or bolt so as to prevent them from being accessed.

The centre bolt is adapted to be connected to the main module by means of a threading such that the axial position of the centre bolt (as seen along the axis of rotation of the wheel) can be adjusted by rotating the centre bolt relative the main module. This axial movement of the centre bolt causes the expander, which is adapted to be operably connected to the centre bolt, to expand at least in a radial direction of the wheel to engage with the wheel and thereby secure the module to the wheel. Finally, the locking mechanism is adapted to be arranged in a locking state in which the locking mechanism prevents the centre bolt from rotating relative the main module, and in an open state in which the locking mechanism allows the centre bolt to rotate relative the main module.

According to another aspect, a main module is provided, which may be similarly configured as the main module according to the previous aspect. The main module may be configured to be fitted in a surrounding structure. The main module, also referred to as a locking module, may comprise a centre bolt adapted to be connected to the locking module by means of a threading such that an axial position of the centre bolt, as seen along the axis of rotation of the centre bolt, can be adjusted by rotating the centre bolt relative the locking module. The locking module may further comprise an expander adapted to be operably connected to the centre bolt such that the expander expands in a radial direction relative the axial direction of the centre bolt as the axial position of the centre bolt is adjusted, such that the expander engages with surrounding structure and thereby secures the module to said structure. Further, the locking module may comprise a locking mechanism adapted to be arranged in a locking state in which the locking mechanism prevents the centre bolt from rotating relative the locking module, and in an open state in which the locking mechanism allows the centre bolt to rotate relative the locking module.

The surrounding structure may for example be an opening or a recess into which the locking module can be fixedly secured so as to block or prevent access. Examples of such openings may be the inlet of storage tanks such as e.g. fuel filler inlets for vehicles and fuel dispensers at filling stations.

The blocking means may be understood as protective cases or a covering means adapted to restrict, limit or block access to the bolt head and/or lug nut, thereby hindering or at least making it harder for an unauthorized person to undo the bolts/lug nuts and remove the wheel. The blocking means may be attached as separate items to the main module, and may preferably be arranged so as to cover all of the bolts/nuts of the wheel. Further, the blocking means may comprise an engaging means, or engaging structure, adapted to secure or fixate the blocking means to the main module when the main module is attached to the wheel. In this way, the main module may prevent the blocking means from being removed from the wheel. The main module may for example be adapted to push or clamp the blocking means towards the wheel. Examples of blocking means include form fitting structures and mutually engaging structures, such as projections, shoulders and recesses.

According to an aspect, the blocking means may form an integral part of the main module. The blocking means may for example comprise a plurality of elements adapted to cover the nuts or bolts of the wheel, and may preferably be arranged in a pattern corresponding to the position of the bolts/nuts of the wheel.

The centre bolt according to any of the above aspects may be threaded directly in the material of the main module, or indirectly via a socket or spacer that is fixated in the main module. In case a socket is used, the socket may be formed of a material having a higher stability and mechanical strength than the material of the remaining parts of the main module. The threading may be oriented such that the centre bolt, upon rotation in the threading, moves along the axis of rotation of the wheel. The rotation may for example be achieved by means of a key or a wrench fitting with the centre bolt.

The expander is arranged to secure the module to the structure to which the main module is to be secured. This may for example be a wheel or a fuel filler inlet of a vehicle. The securing may for example be achieved by a mechanical means that is operated by the axial movement of the centre bolt to engage with the surrounding of the main module. The mechanical means may for example be configured to expand in the radial direction of the wheel upon rotation of the centre bolt, resulting in an interference fit or press fit between the expander and the surrounding material. Further, the expander may be moved also in an axial direction, which may allow the main module to be clamped against for example the wheel. Thus, the module may be securely fixed by tightening the centre bolt.

When the module has been installed and secured, for example by tightening the centre bolt as described above, the locking mechanism may be brought into its locking state to prevent an unauthorized entity from removing the locking means and thereby accessing the nuts/bolts of the wheel, or the fuel filler. The locking mechanism may be configured to prevent the centre bolt from being turned or rotated in the main module. This may be achieved in a number of ways, some of which being discussed in further detail in connection with the detailed description of the drawings. In one example, the locking mechanism may comprise a bolt that can be fixed to the centre bolt and to the main module to prevent rotational movement between the two. The bolt of the locking mechanism may for example have a flat side that engages with a corresponding surface in the centre bolt and the main module to keep the bolt from rotating. The locking mechanism may, in the locking state, be axially secured to for example the wheel by means of a washer configured to engage with a backside of the main module. To bring the locking mechanism in the open state, the washer may be rotated such that it can be released from its engagement with the main module and the bolt removed from the centre bolt. Alternatively, or additionally the locking mechanism may comprise a locking pin or ball that can be moved in the radial direction and engage with the centre bolt to prevent it from rotating and to the secure the locking mechanism to the module in the axial direction. To release the locking mechanism, the locking pin or the locking ball can be retracted.

The locking mechanism may in some examples be a key operated lock, such as e.g. the Assa Desmo+ or Abloy camlock.

According to an embodiment, the expander may comprise a plurality of segments, wherein each of the segments is movable in the radial direction so as to engage the module to the surrounding structure. In one example, each segment may comprise a tapered surface configured to slide on a corresponding tapered or cone shaped surface of the centre bolt as the centre bolt moves in the axial direction. Thus, the tapered surfaces of the centre bolt and the segment may cooperate to transform an axial movement of the centre bolt into a combination of a radial movement and an axial movement of the segment. In this way, the expander is allowed to be radially press fitted to the rim or wheel upon tightening of the centre bolt, and at the same time push the main module towards for example the wheel or fuel filler inlet. The segments may in some examples form part of a circular washer arranged around the centre bolt.

According to an embodiment, the expander comprises a material configured to be compressed elastically in the axial direction and to expand elastically in the radial direction as the axial position of the centre bolt is adjusted. The expander may, according to this embodiment, for example be a washer or plate arranged to be compressed between an end portion of the centre bolt and the backside of the main module (i.e., the side of the module facing the wheel when mounted) as the centre bolt is rotated. By compressing the expander in this manner, it may at the same time be caused to expand laterally or radially and thereby be press fitted to the rim, wheel or fuel filler inlet. Examples of elastic material may include a polymeric material such as e.g. rubber.

According to an embodiment, the expander may comprise a retaining means configured to pull the segments towards a centre of the expander. The retaining means may for example be formed as a rubber band encircling the periphery of the annular segments for pushing them together and prevent them from falling apart when the module is removed. The periphery of the segments may be provided with a groove for accommodating the retaining means. The groove may be arranged in the contact surface that engages the surrounding structure, so as to protect the retaining means from being damaged by the press fitting.

It will be appreciated that the expander may cooperate with the axial movement of the centre bolt so as to fasten the module to for example the wheel by means of a force acting in the axial direction, the radial direction or a combination of both. The radial engagement may be achieved by a radial expansion of the expander as described above, whereas the axial engagement may be achieved by allowing the expander to engage a shoulder of for example the wheel or fuel filler inlet. In the latter case, the expander may be inserted behind the shoulder and expanded radially such that is prevented from being retracted.

According to an embodiment, the blocking means may be formed as a dish that is adapted to cover the nuts or bolts of a wheel. The main module may in this case be adapted to be fitted in a centre hole of the dish in a way that secures the dish to the wheel.

According to an embodiment, the locking mechanism may comprise an axial recess, or lock-hole, formed in the centre bolt, a detachable socket having a through hole and being adapted to be rotationally secured to the main module, and a detachable locking bolt, or lock, adapted to be inserted into the main module via the through hole and the axial recess. The axial recess and the through hole may be configured to be aligned with each other, and the locking bolt may be adapted to prevent the centre bolt from rotating relative the socket.

According to an embodiment, the detachable socket may comprise recesses and protrusions, also referred to as teeth and flat areas, configured to engage with corresponding recesses and protrusions, also referred to as a 'specific pattern', of the main module. This allows for the socket to be both detachable (i.e., dismounted in the axial direction) and rotationally secured to the main module.

According to an embodiment, the module may further comprise a locking socket adapted to be rotationally secured to the main module, wherein the locking socket comprises an inner threading adapted to receive a locking bolt, and recesses and protrusions forming a pattern configured to engage with a corresponding pattern of recesses and protrusions of the detachable socket. The locking socket may be used together with the locking bolt to prevent the centre bolt from rotating.

According to an embodiment, the locking bolt may be configured to be inserted via a front side of the module (facing away from the wheel) and to be secured in the axial direction by engaging a back side of the module (facing the wheel).

BRIEF DESCRIPTION OF DRAWINGS

The above, as well as additional objects, features and advantages of the present invention, will be better understood through the following illustrative and non-limiting detailed description, with reference to the appended drawings. In the drawings, like reference numerals will be used for like elements unless stated otherwise.

FIG. 4A is a perspective view, FIG. 4B is a top view, FIG. 4C is a bottom view, FIG. 4D is a side view, FIG. 4E is a cross sectional view.

Figure 1:
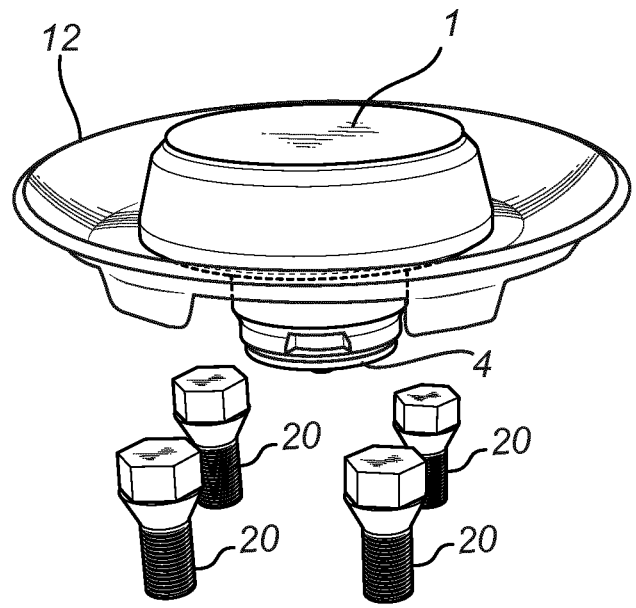
FIG. 1 is a perspective view of a main module fitted with a blocking means according to an embodiment.

The main module 1 may comprise an opening 15 arranged in its centre to house a centre bolt 3 (shown in FIG. 6) and a threaded socket 5 (shown in FIG. 8). The opening 15 of the main module has a socket with a pattern 14 on its inner circumference that matches the pattern 51 of an upper rim of the threaded socket 5 (shown in FIG. 9).

The main module 1 may comprise a multitude of radially extending elements 12 to cover lug nut heads of bolts attaching the car wheel. The main module 1 has a centre part 16 comprising an edge or corner 13 adjusted to fit different rims with centre hole diameter of different sizes. The corner 13 may rest directly on the rim or there may be spacers between the rim and the corner. The corner 13 may also have an extension (not shown in the present figure) to fit different rims. The main module 1 also has a space 10 which is adjusted to each different hub caps and a ridge 11 to secure the hub caps on place.

Figure 5A:
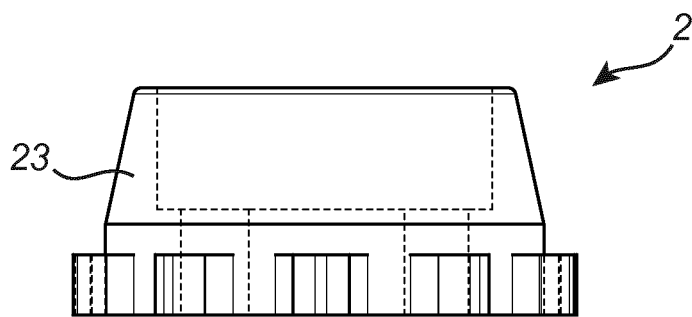
Figure 5B:
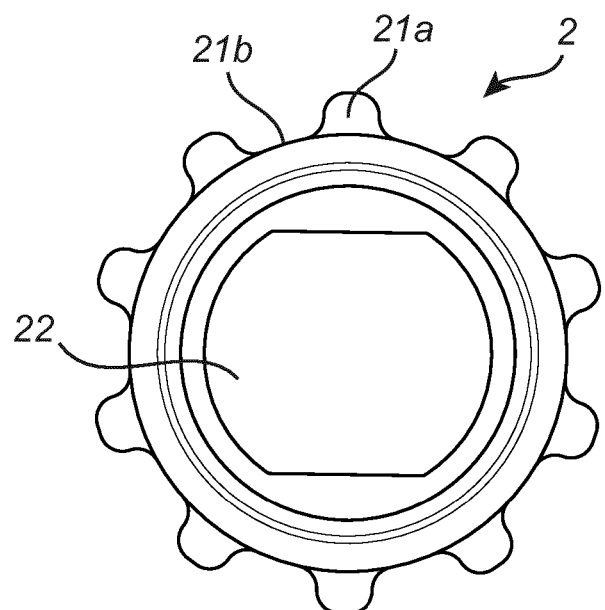
Figure 5C:
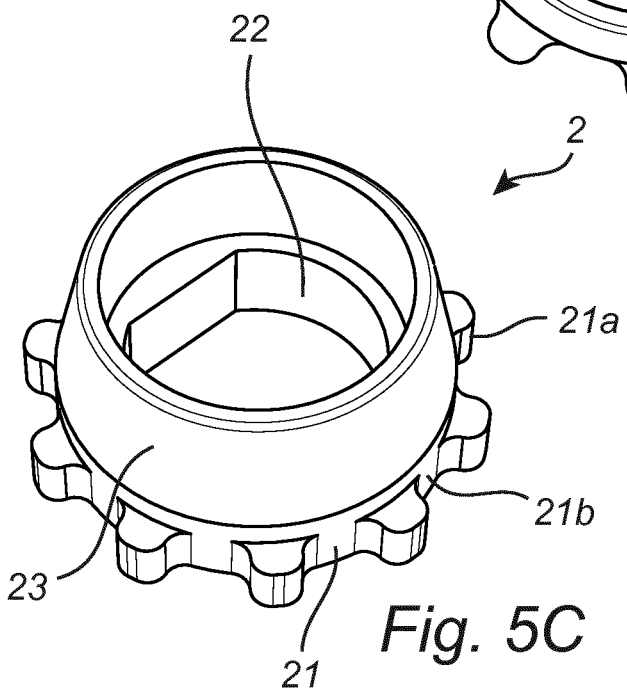

FIGS. 5A-C shows the locking cap, or locking socket. FIG. 5A is a cross sectional view and FIG. 5B is a top view. FIG. 5C is a perspective view. The locking cap 2 has a cylindrical part 23 and a circular part 21 that has a hole 22 having same size and shape as an inner part of a lock (shown in FIG. 9). The outer rim of the circular part 21 has a toothed pattern comprising of multitude of protrusions and recesses, such as for example extending teeth 21a and flat areas 21b in between the teeth.

Figure 6A:
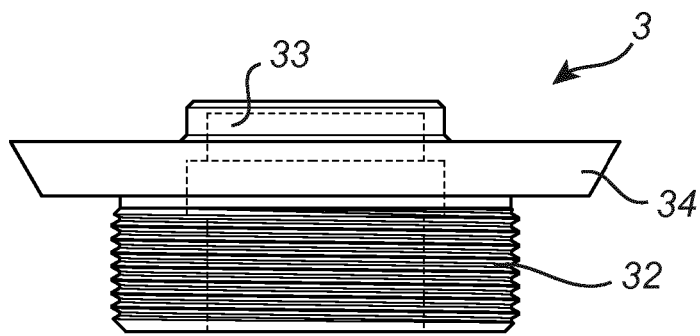
Figure 6B:
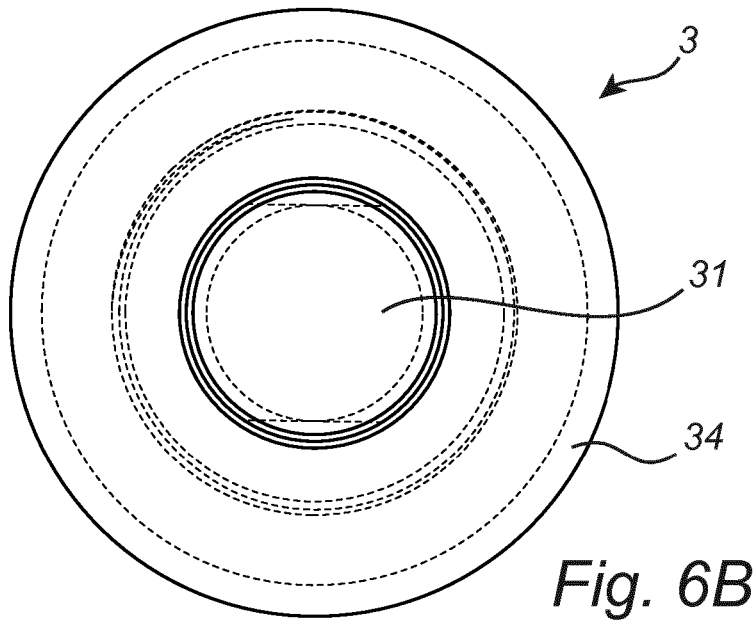
Figure 6C:
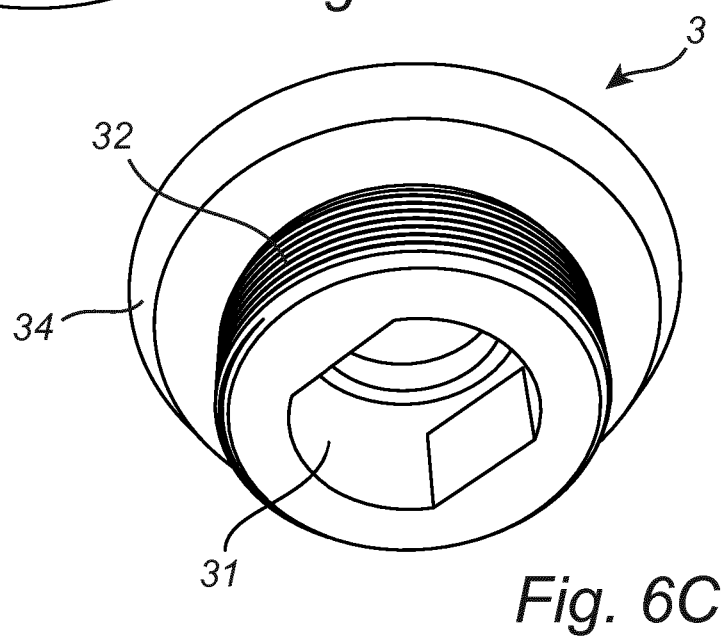

FIGS. 6A-C shows the centre bolt 3 according to an embodiment. FIG. 6A is a side view, FIG. 6B is a top view, and FIG. 6C is a perspective view.

The centre bolt 3 has a threaded outside 32 and a hole 31 or recess in the shape of a lock, so as to allow a lock to be inserted into the hole. The threaded outside 32 is to be threadedly attached to the threaded socket 5 (shown in FIG. 8) by screwing (i.e. the threaded outside 32 of the centre bolt 3 matches with the threads of the threaded socket). The centre bolt 3 has a lateral circular extension that has sloped edges 34 to have contact with the surface 45 of the expander 4 (FIG. 7).

Figure 7A:
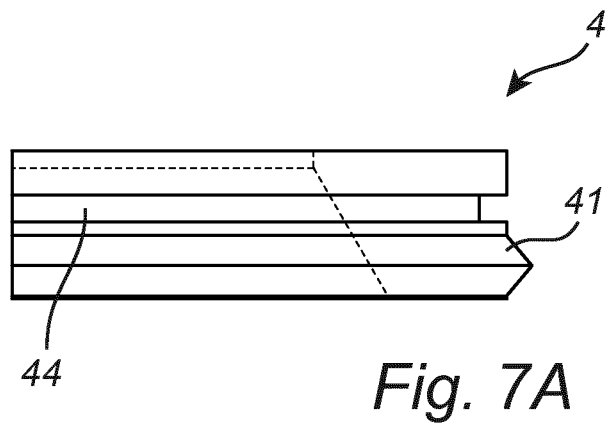
Figure 7B:
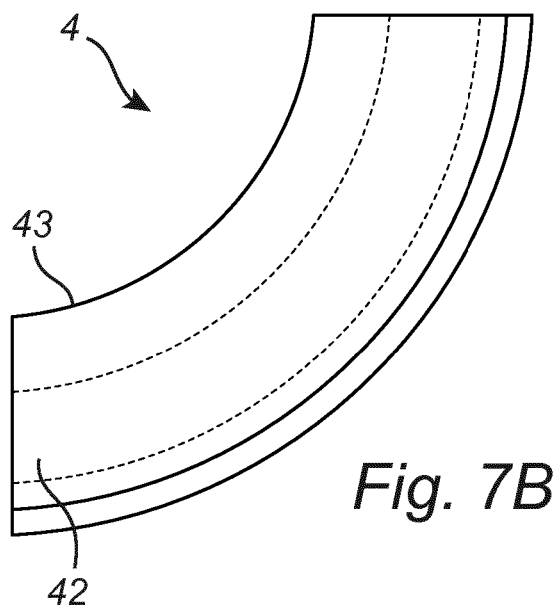
Figure 7C:
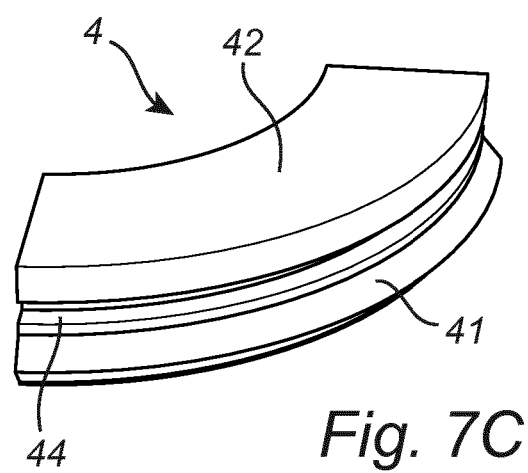

FIGS. 7A-C shows an example of the expanders. FIG. 7A is a side view, FIG. 7B is a top view, and FIG. 7C is a perspective view. Four expander sections 4 in this embodiment form a full expander that is circle shaped. The number of expander sections can vary from 1 (full circle) to any feasible number. The expander may be made of rubber, metal or other materials. The expander sections have a ridge 41 that is fitted behind a ridge inside the rim. However, in some cases, depending on the shape of the inside of the rim, the sections may not have the ridge. The expander sections have a flat top area 42 that is configured to slide on centre part area 16 (shown in FIG. 4). The inside circumference 43 is configured to be toward the centre bolt 3 (shown in FIG. 6). The expander sections may be held together by means of a retaining or attachment means (a rubber band, wire or such) so as to form a full circle expander. Area 44 may be configured to hold the attachment means. The surface 45 of the expander may be brought in contact with the surface 34 of the centre bolt 3. Due to the slope of the surface 34, screwing the centre bolt inwards (toward the wheel) may cause the expander segments to move radially. In case of an expander formed of an elastic material, the movement of the centre bolt may cause the expander to expand in the radial direction.

Figure 8A:
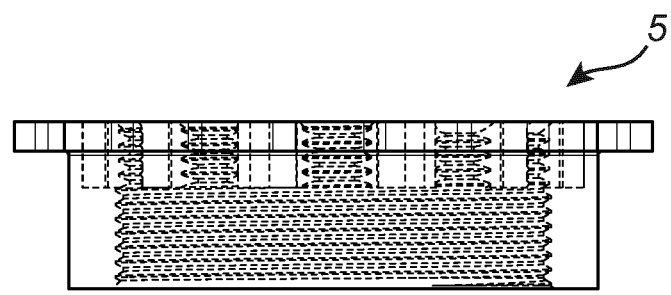
Figure 8B:
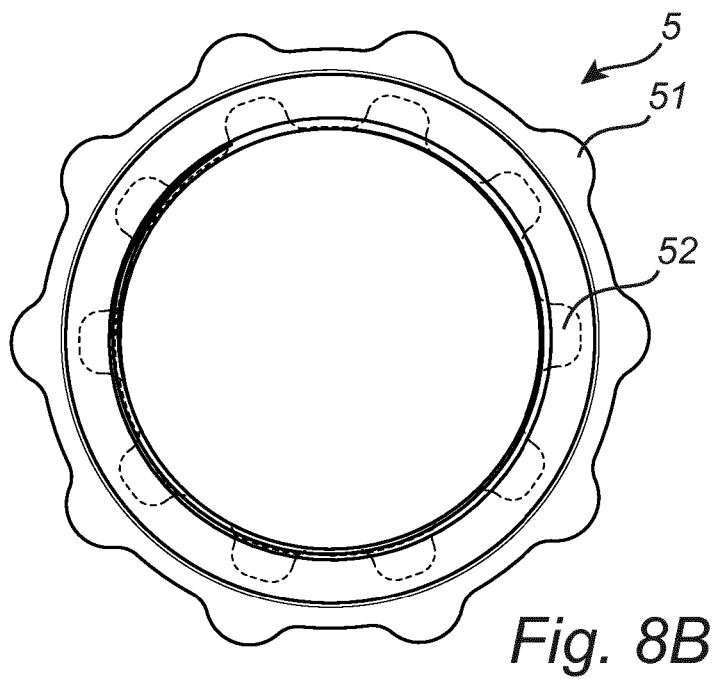
Figure 8C:
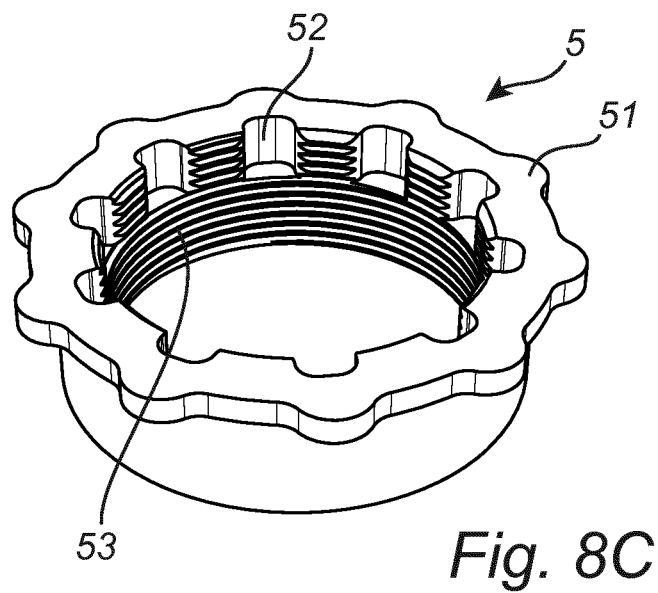

FIGS. 8A-C show the "threaded socket" 5 according to an embodiment. FIG. 8A is a cross sectional view and FIG. 8B is a top view. FIG. 8C is a perspective view. The threaded socket has a cylindrical part with threaded inside 53. The threaded inside matches with the threaded outside 32 of the centre bolt 3 shown in FIG. 6. The threaded socket 5 has an upper rim with an external pattern 51. The pattern 52 matches with the pattern 14 of the socket of the main module (shown in FIG. 4). The threaded socket has grooves 52 in its inside to match the pattern 21 of the locking cap 2 shown in FIG. 6.

Figure 9:
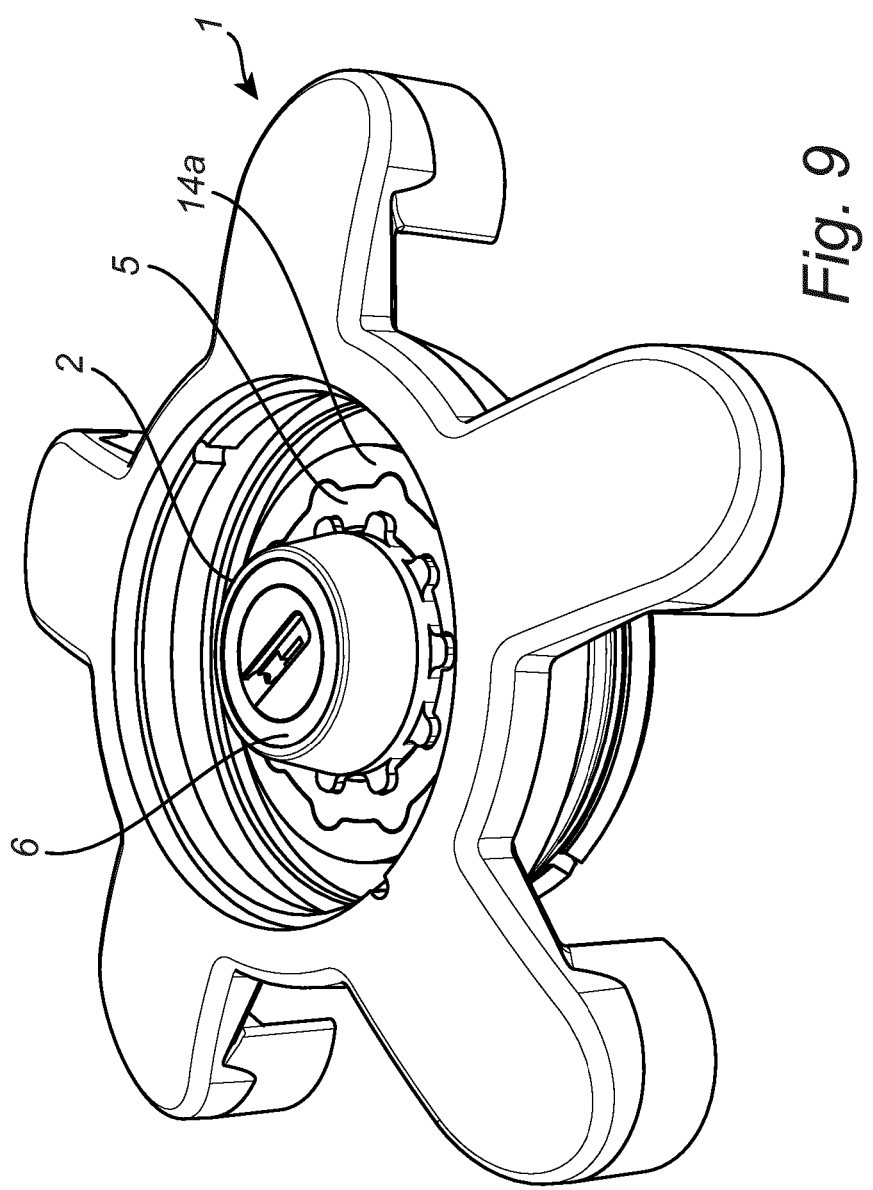

FIG. 9. is a perspective view of an embodiment of the device, when mounted. The figure shows main module 1 and the socket of the main module 14a, the locking cap 2, the threaded socket 5, and a lock 6.

Figure 10:
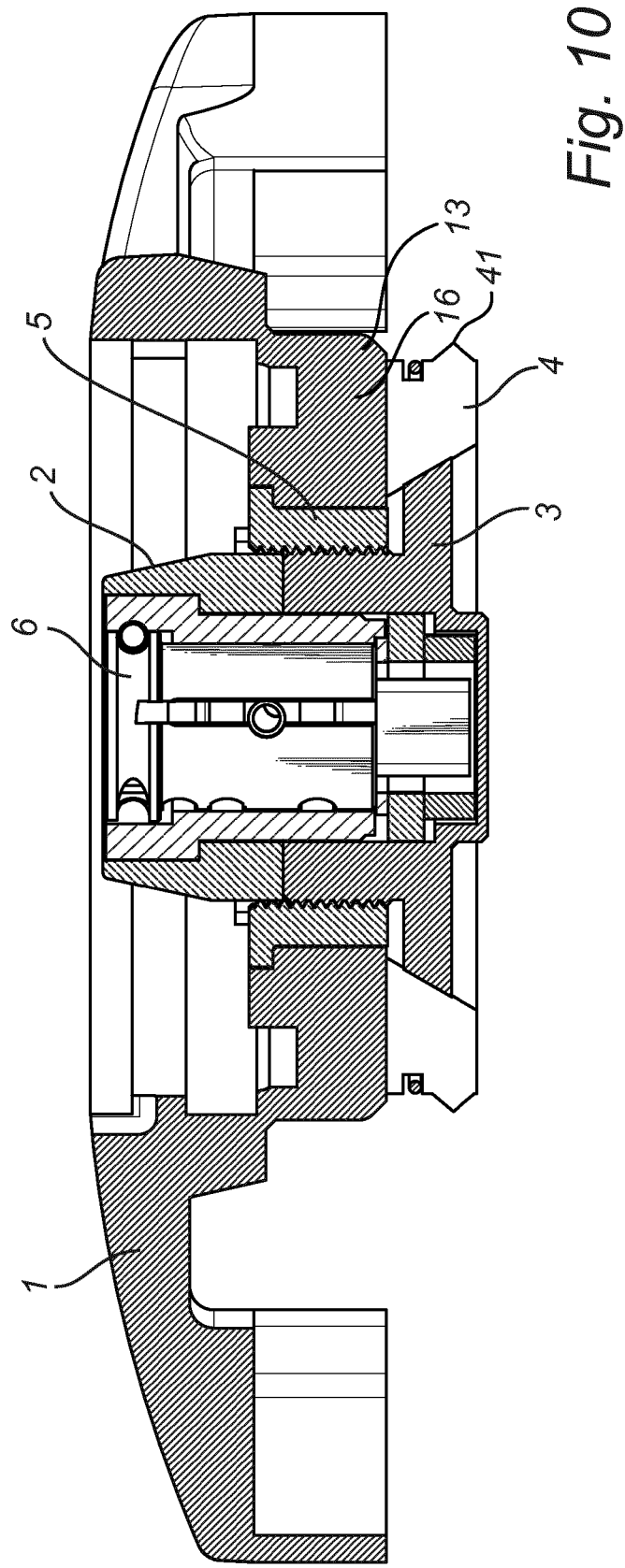
Figure 11:
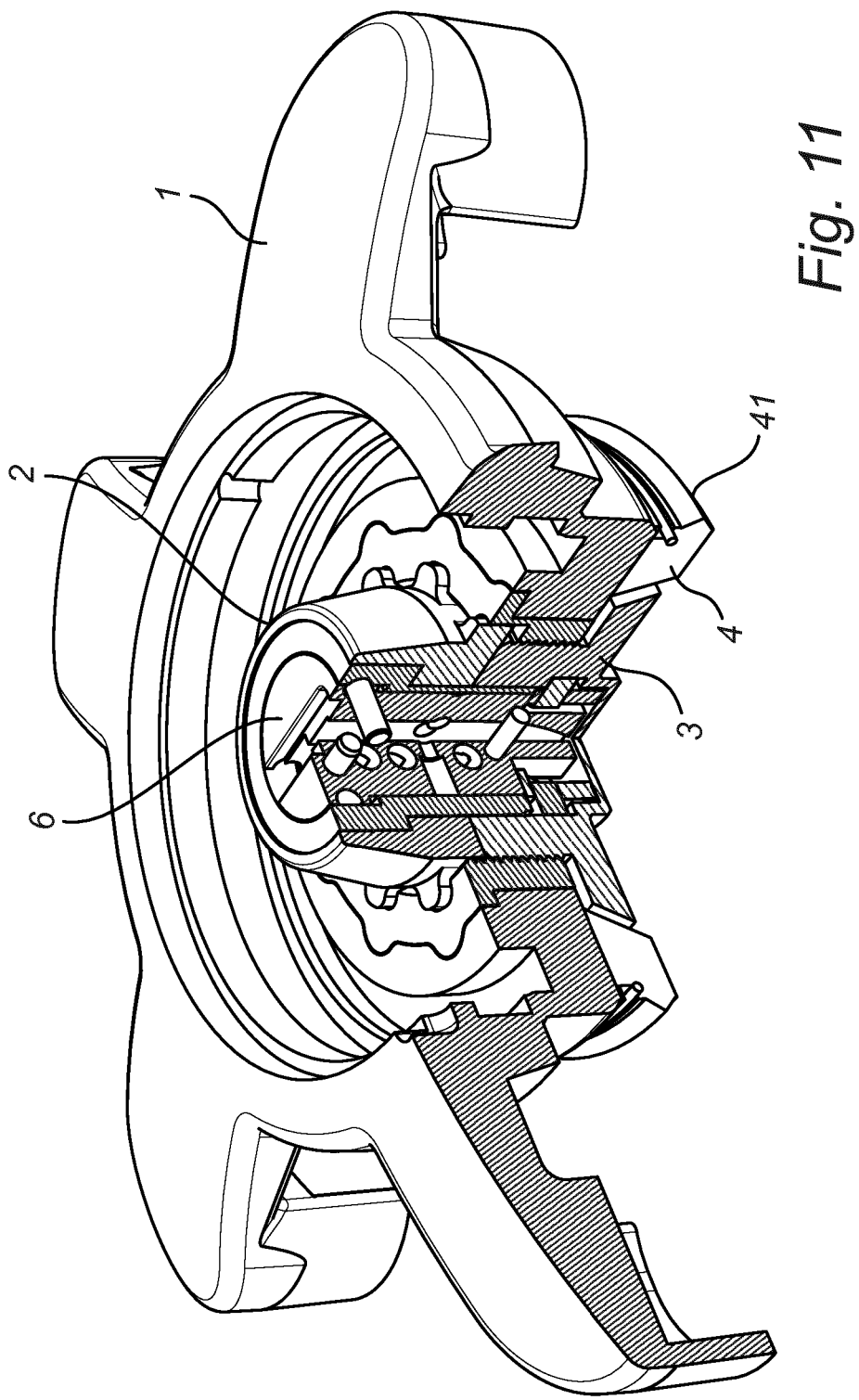

FIGS. 10-11 are cross sectional views of embodiments of the device when mounted. The figures show the main module 1, the locking cap 2, the centre bolt 3, the expander 4, the threaded socket 5, and the lock 6.

Figure 12:
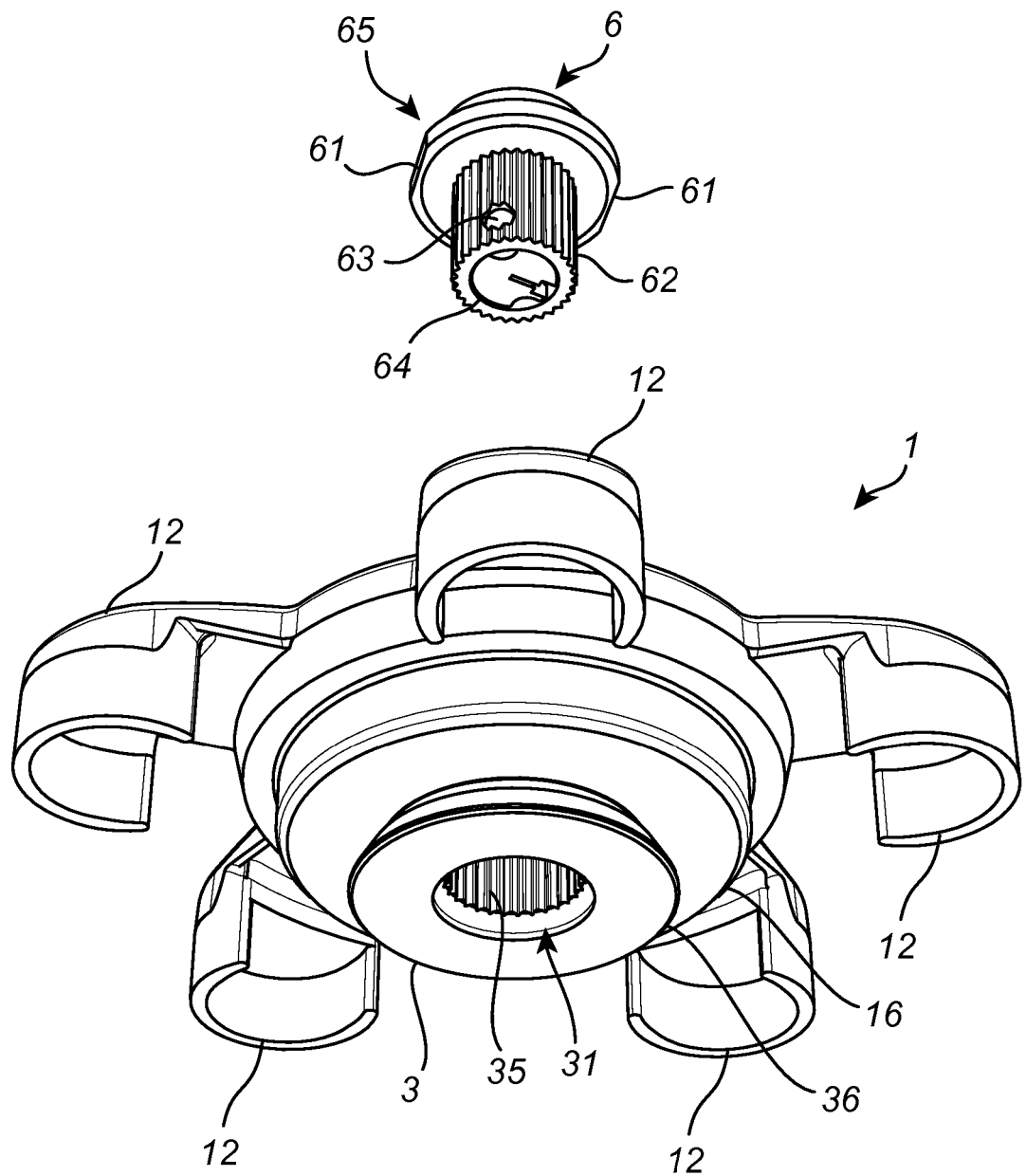

FIG. 12 is a perspective view of a device according to an embodiment, comprising a centre bolt 3 and a locking mechanism 6 (not mounted) for fixating the centre bolt 3 in the main module 1.

Figure 13:
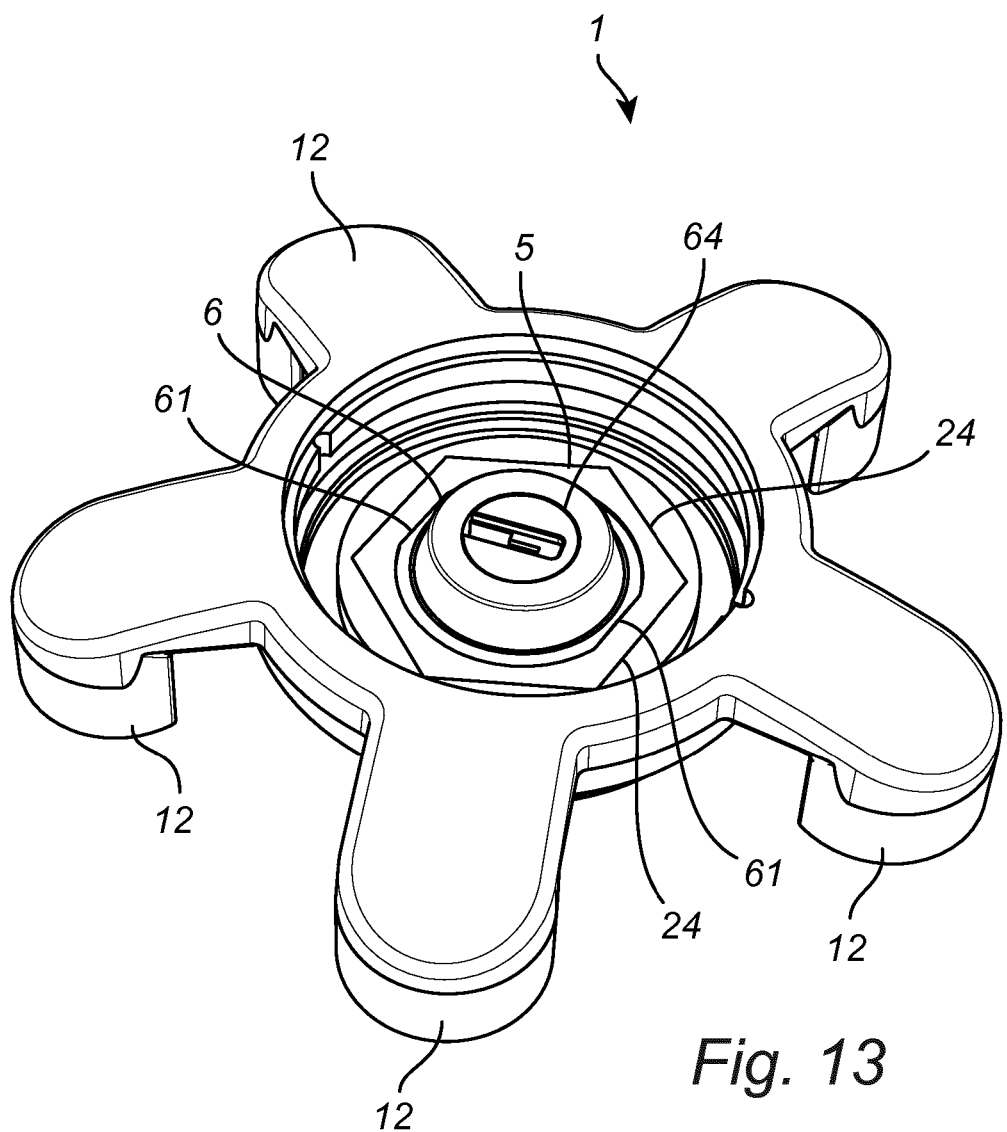

FIG. 13 is a perspective view of a device according to an embodiment, showing a locking mechanism 6 that is inserted in the centre bolt 3 and attached to the main module 1 via a socket 5.

Figure 14:
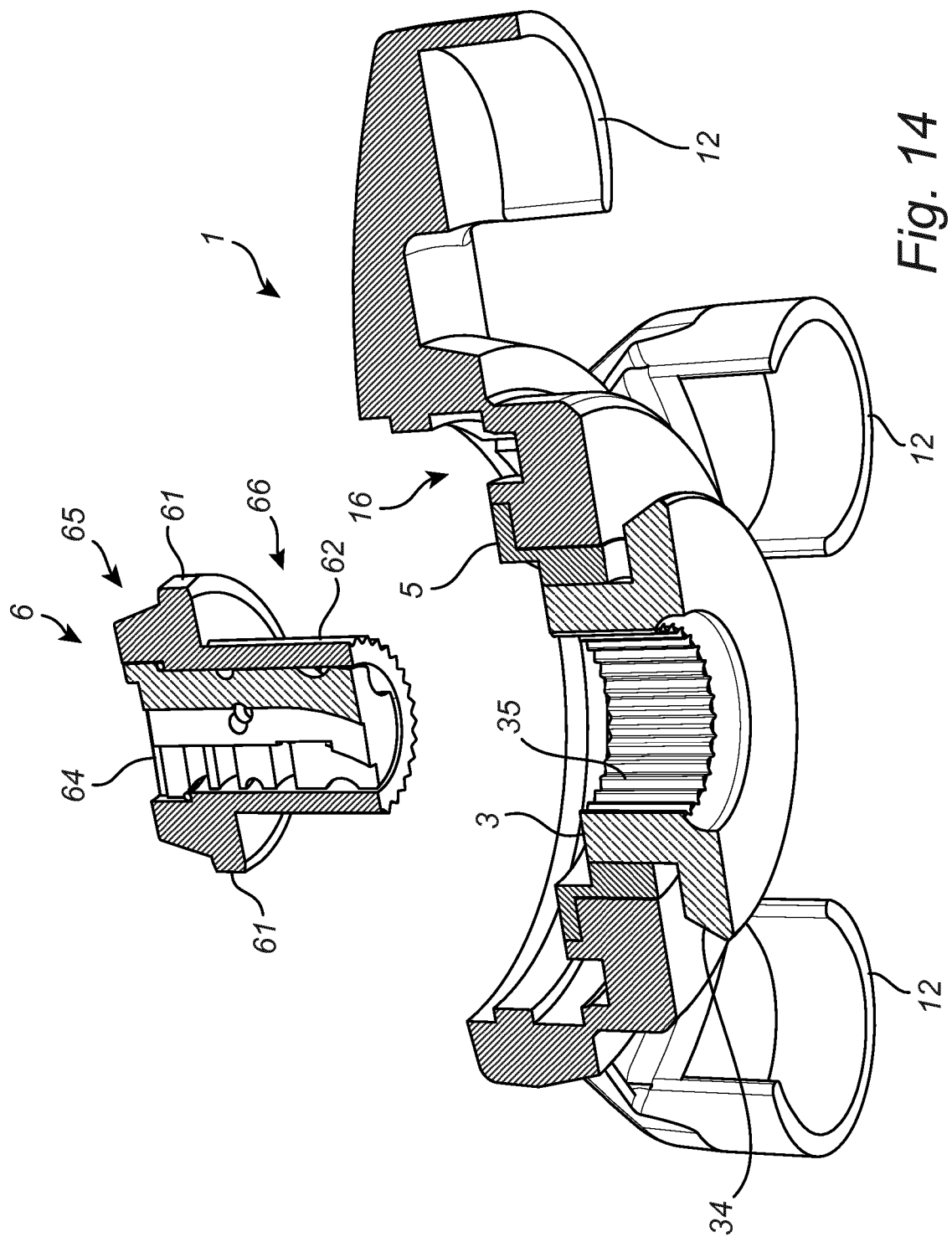

FIG. 14 is a cross sectional view of a device according to an embodiment, illustrating an example in which the locking mechanism 6 (not inserted) can be mated with the centre bolt 3 by means of a spline structure.

DETAILED DESCRIPTION

Figure 2:
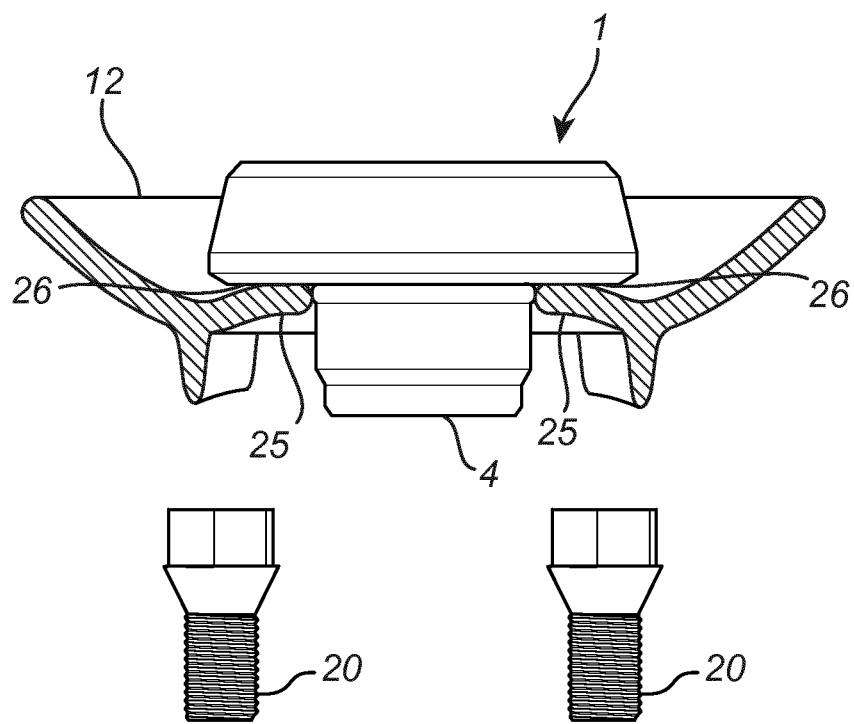
FIG. 2 is a side view of the main module in FIG. 1, and shows the blocking means in cross section.

FIGS. 1 and 2 illustrate an embodiment of the present invention, comprising a main module 1 that is adapted to be fitted with a blocking means 12 for covering nut or bolts 20 of the wheel of the vehicle (not shown). The main module 1 may comprise an expander 4 configured to expand in a radial direction of the wheel so as to engage with the wheel and thereby secure the module 1 to the wheel. The expander 4 may be adapted to be operably connected to a centre bolt (not shown in FIGS. 1 and 2), which may be threaded in the main module 1 such that an axial position of the centre bolt, as seen along the axis of rotation of the wheel, can be adjusted by rotating the centre bolt relative the main module 1. The adjustment of the axial position of the centre bolt may cause the expander 4 to expand in the radial direction. Even though the main module 1 is illustrated as being attached to the wheel of a vehicle, it will be appreciated that the main module according to the present disclosure also may be employed for other purposes and contexts, such as for example for blocking or preventing access to the inlet of storage tanks, fuel filler inlets for vehicles, and fuel dispensers at filling stations. For those applications, the main module 1 may be used without the blocking means 12 and be provided with an expander having a size and shape allowing it to engage the inlet or surrounding structure in which the main module 1 is to be fitted.

In the present embodiment shown in FIGS. 1 and 2, the main module may be configured to be used with a separate blocking means 12 shaped as a dish adapted to cover the nuts or bolts 20 of the wheel. The main module 1 may comprise a shoulder 26 configured to engage with an inner circumferential edge 25 of the blocking means 12, such that the main module 1, when attached, may push the blocking means 12 towards the wheel in the axial direction.

Figure 3:
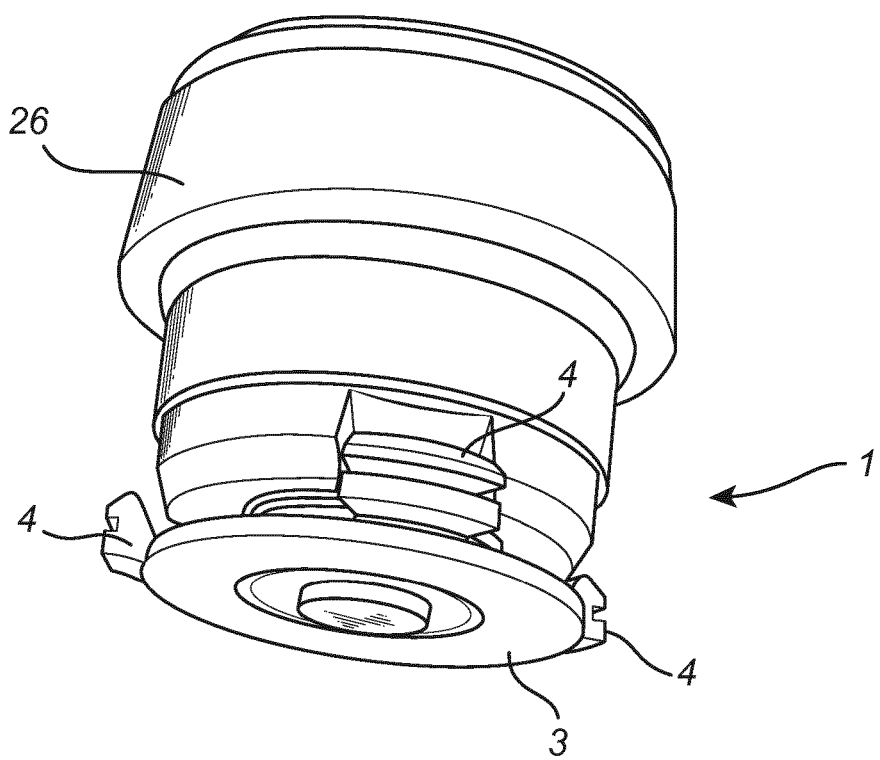
FIG. 3 is a perspective view of a main module according to an embodiment.
Figure 4A:
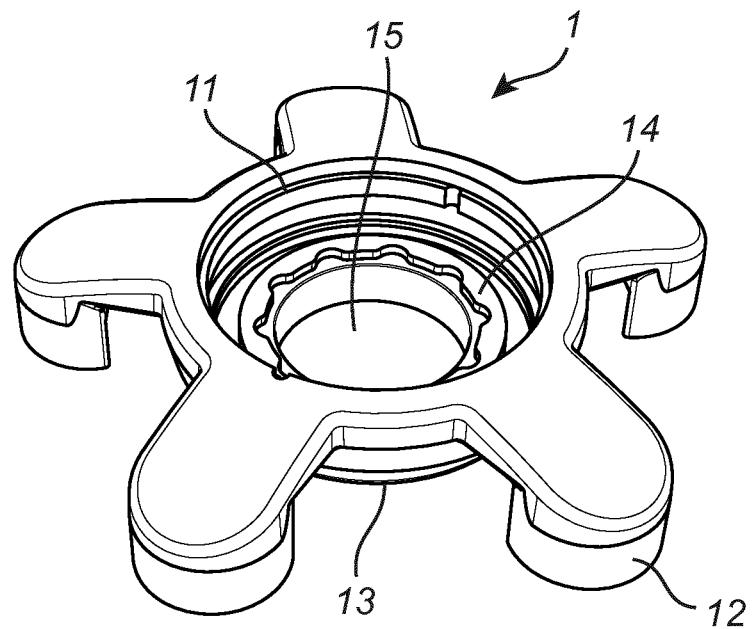
FIG. 4A-E shows the main module (also called locking component) 1.
Figure 4B:
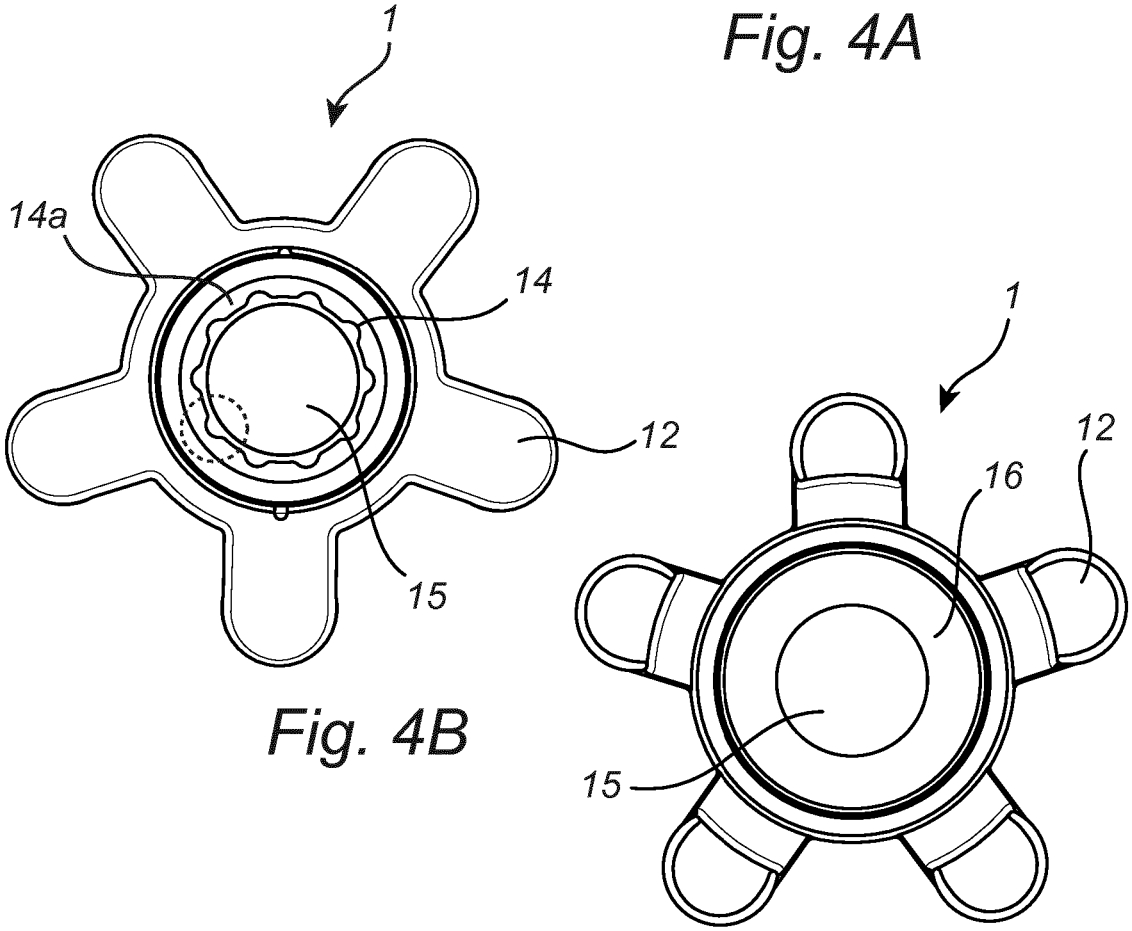
Figure 4C:
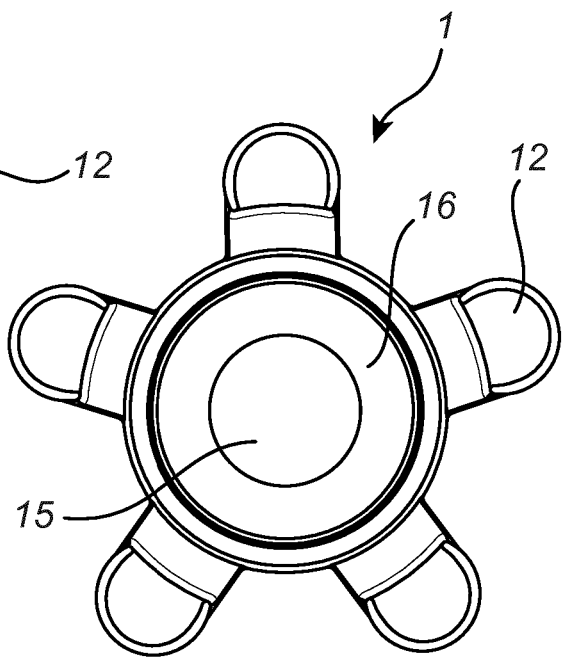
Figure 4D:
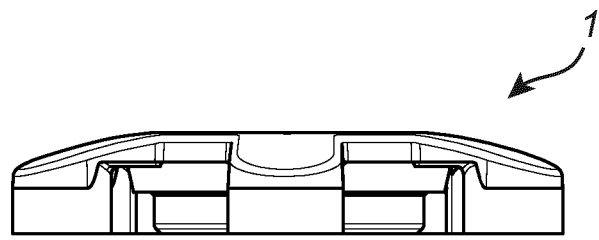
Figure 4E:
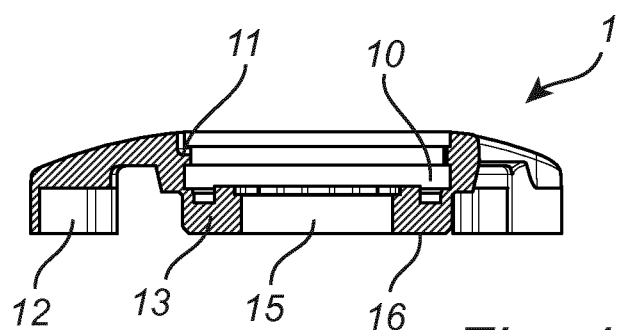
Figure 4F:
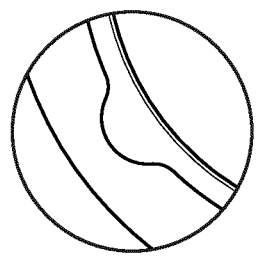
FIG. 4F is a detail from FIG. 4B.

FIG. 3 shows a main module 1 according to an embodiment, which may be similarly configured to the embodiment described with reference to FIGS. 1 and 2. The main module 1 of FIG. 3 comprises a centre bolt 3, having a flat end portion arranged to push the expander segments 4 towards a slanting surface of the main module 1 such that the segments 4 expand radially and also are moved axially. The main module 1 may for example be arranged in a hole or conduit, such as the fuel filler of a vehicle, so as to prevent unauthorized access to the fuel tank.

An alternative design is disclosed in FIGS. 4A-F, illustrating a main module 1 in which the blocking means 12 forms an integral part of the main module 1. In contrast to the embodiment shown in FIGS. 1 and 2, the blocking means 12 in the present example is not provided as a separate part. Further, the blocking means 12 may comprise a plurality of radially extending elements 12, each of which being configured to cover a respective lug nut or bolt 12. Except for the blocking means, the following description of the locking mechanism 2, 5, 6, the centre bolt 3, and the expander cooperating with the centre bolt 3 is applicable also to the embodiments disclosed in connection with FIGS. 1 to 3.

As illustrated in for example FIGS. 4A-F, the centre bolt 3 may be threaded in the opening 15, either directly in the material of the main module 1 or indirectly via for example a threaded socket 5. In this particular example, the centre bolt may be connected to the main module via a threaded socket 5 that is mounted in the main module by means of recesses and protrusions 51 forming matching patterns on the outer side of the threaded socket 5 and in the main module 1.

The centre bolt 3 may be threaded into the threading 53 of the threaded socket 5 and locked by means of a locking socket or locking cap 2. Such a locking socket 2 is disclosed in FIGS. 5A-C. The locking socket 2 may comprise protrusions 21a and recesses 21b matching a corresponding structure 52 in the threaded socket 5 illustrated in FIG. 8A-C. Thus the main module 1, the locking socket 2, and the centre bolt 3 as shown in FIGS. 1-11 can be assembled together by using the matching specific patterns and the threads.

FIGS. 6A-C show an example of the centre bolt 3, comprising a cylindrical part with threaded 32 outer surface that matches the threaded inner side 53 of the threaded socket 5. The centre bolt 3 further comprises a hole or recess 31 for receiving a key or wrench for tightening the centre bolt 3 in the main module 1, and to receive the locking mechanism fixating the centre bolt 3 in its mounted position. As illustrated in the present figures, the centre bolt 3 also comprises a tapered or cone shaped rim 34, against which the expander 4 may slide and expand in the radial direction as the centre bolt 3 rotated and thus moved in the axial direction.

The expander 4 may be formed of a plurality of annular segments placed around the centre bolt 3, such that the tapered surface 34 of the bolt and a corresponding surface 43 at the inner periphery of the expander slide on each other. An example of such an annular segment 4 is shown in FIGS. 7A-C and FIG. 10. The circular segments may be held together by means of a retaining means, such as e.g. a rubber band, squeezing the segments together to a circular shape. The retaining means may be arranged in a groove 44 running around the outer periphery of the annular segments. A skilled artisan realizes that other ways to keep the pieces together are as well possible. Such other ways could include for example a wire. According to one embodiment the expander is composed of four segments, but choosing any number of segments is possible.

Alternatively, the expander 4 can be formed of an elastic material that expands in the radial direction upon compression in the axial direction (not shown in the present figures). Such a material may for example be rubber, and may in some embodiments be provided in one circular piece. When the material of the expander is metal, the expander is preferably made of multiple segments to allow the required flexibility.

The assembled device, comprising the main module 1, the centre bolt 3 and the expander 4, may be inserted into the rim. Additional modules, such as spacers, may be provided so as to adapt the device to the size and shape of the specific rim. In the present example, the corner 13 on the bottom of the main module 1 illustrated in FIG. 4A may be the only contact point with the rim. In the mounted position illustrated in FIG. 11, the elements 12 are now covering the lug nuts on the rim.

To fasten the device to the wheel, a screw tool or key may be placed in the lock hole 31 of the centre bolt (the tool preferably has the same shape as the lock). By turning the tool, the centre bolt is screwed further outwards (the threaded outside 32 of the centre bolt goes against the treaded inside 53 of the threaded socket). Then the surface 34 of the centre bolt, which is in contact with the surface 44 of the expander 4, forces the expander(s) 4 to move outwards from the centre. Simultaneously the surface 42 of the expander slides on the surface 16 of the main module 1. By expanding the expanders 4, the ridge 41 of the expander may be forced underneath the centre of the wheel rim. If the design of the centre of the rim has a ridge space or shoulder, the ridge 41 of the expander 4 may fasten the device axially behind the centre of the rim.

When the module is fasted in the rim, the locking cap 2 may be placed in the threaded socket 5, fitting the pattern in 51 of the threaded socket 5 and the pattern 21 of the locking cap 2 together. Also, the hole 22 of the locking cap 2 and the hole 31 of the centre bolt 3 should be aligned to enable the lock 6 to fit into the holes. The lock may be inserted to prevent any rotation in any direction between the centre bolt 3 the threaded socket 5.

The head of the lock may rest in the space 23. The lock may be brought into a locking state, in which it may prevent the centre bolt 3 from rotating and at the same time securely attached to the device. This may for example be achieved by means of a disc that is arranged by the end of the lock cylinder 6 and rotated to prevent it from passing through the hole 31 in the centre bolt 3, or by means of locking pins or balls (not shown) arranged to be moved in the radial direction to engage with the centre bolt 3. The locking pins or balls may be released when the lock is brought back to the open state, allowing it to be withdrawn from the centre bolt 3.

Finally, a hub cap may be placed on top of the module. To provide locking devices fitting to various designs, the space 10 and the ridge come in different shapes and sizes.

The lock 6 could be for example AssaAbloy's cylinder lock in Desmo and Desmo+ series; but other locks may also be used. The lock may be operable by turning a key. In another embodiment the lock is operable electronically. It may be operated with a remote controller or via a smartphone.

It will however be appreciated that the above embodiments are merely examples illustrating the present inventive concept. Other illustrative embodiments are equally conceivable. A few of them will now be described in the following, with reference to FIGS. 12-14.

FIG. 12 is a perspective view of a device according to an embodiment, which may be similarly configured as the embodiments described with reference to FIGS. 1-11. The device may comprise a body forming a main module 1, or centre part, and a blocking means 12 for at least partly covering the nuts or bolts of the wheel. The blocking means may be in the form of a plurality of cases or elements 12, or in the form of a single dish or washer shaped element. Further, in an embodiment, the blocking means 12 does not form part of the device. Instead, the main module 1 may be configured to be releasably attached or fitted to the blocking means 12.

The body is configured to be arranged at the hub of the wheel, such that the axis of rotation of the wheel passes through a centre of the main module and the bolt or nut cases 12 extend radially outwards from the axis of rotation.

The device may further comprise a centre recess or hole, in which a centre bolt 3 may be arranged in a manner that allows its axial position to be varied between a state in which the device is fixed of locked to the wheel and in a state in which the device can be removed from the wheel. The locking state may for example be achieved by allowing a rim or edge 36 of the centre bolt 3 clamp the wheel or rim in the axial direction, or by allowing the centre bolt 3 to radially expand an expander 4 such that it is press fitted against the wheel or rim in the radial direction as described above in connection with previous embodiments. In one example, the centre bolt 3 may be threaded in the main module 1 (either directly or indirectly via a socket), such that the axial position of the bolt 3 can be adjusted by rotating the bolt 3 in the threading.

As illustrated in the present figure, the centre bolt 3 may be provided with a recess or through hole 31 which may be configured to receive or accommodate a locking mechanism 6 for preventing further rotational movement of the centre bolt 3 in relation to the main module 1. The recess or through hole 31 may be arranged in a centre of the bolt 3, and may preferably be aligned with the axis of rotation of the wheel. Further, the inner wall of the recess or through hole 31 may be provided with a locking structure for engaging the locking mechanism 6 when it is inserted in the centre bolt 3 such that the locking mechanism 6 is secured in the centre bolt 3 in a manner that prevents the locking mechanism 6 from being rotated in the centre bolt 3. This may for example be achieved by forming a plurality of recesses and protrusions 31 in the centre bolt 3 and allowing them to engage a corresponding structure in the locking mechanism. In the present example of FIG. 12, ridges or teeth forming a spline structure 35, may be used for mating the locking mechanism 6 and the centre bolt 6.

The locking mechanism 6 may comprise a first part 65 that can be mated with the main module 1 for maintaining the angular or rotational correspondence between the locking mechanism 6 and the main module 1. This may for example be realized by means of an outer circumference that is not rotationally symmetric, and which may be fitted in a corresponding structure in the main module 1. In the example illustrated in FIG. 12, the locking mechanism may be provided with a straight or flat edge 61 configured to engage with a similar edge in the main module 1 to achieve a rotational fixation in the main module 1. Further, the locking mechanism 6 may comprise a second part 66 that can be mated with the centre bolt 6 as described above. In the present example, the second part 66 may comprise a spline structure 62 configured to mate with the spline structure 35 of the centre bolt 3 to maintain the angular correspondence between the locking mechanism 6 and the centre bolt 6 when the locking mechanism is inserted in the centre bolt 6. In this way, the centre bolt 3 may be rotationally fixed to the main module 1 through the torque transferred by the locking mechanism 6.

The locking mechanism 6 may further comprise an axial locking means for securing the locking mechanism 6 to the device in the locking state. The locking means may for example be formed of a pin or a ball that can be moved in the radial direction and engage with the centre bolt 3 to prevent the locking mechanism 6 to be removed. In FIG. 12, an example is illustrated comprising a ball 63 that can be actuated by a lock cylinder 64 to fixate the locking mechanism in the centre bolt 6.

FIG. 13 is another perspective view of a device that may be similarly configured as the device shown in FIG. 12. In the current view, the locking mechanism has been inserted in the centre bolt 6. FIG. 13 also indicates the position of the socket 2, which may be inserted in the recess or through hole of the main module 1 to strengthen the engagement between the centre bolt 3 and the main module 1. The socket 2 may be rotationally or key fitted in the main module 1 by straight of flat edges 24 engaging a corresponding structure in the main module 1. Further, an inner circumference of the socket 2 may be provided with a straight or flat edge configured to engage a similar edge 61 of the first part 65 of the locking mechanism 6 for maintaining the angular or rotational correspondence between the locking mechanism 6 and the main module 1.

FIG. 14 is a cross section of a device according to an embodiment, which may be similarly configured as the devices shown in FIGS. 12 and 13. In the present figure, an example arrangement of the threaded socket 5 is illustrated. The threaded socket 5 may be rotationally secured in main module as described above, and comprising a thread into which the centre bolt 3 may be screwed. The relative rotational movement between the centre bolt 3 and the main module 1 may be prevented or hindered by inserting the locking mechanism 6, comprising a first part 66 having an edge or rim 61 for engaging the socket 2 (and thus the main module 1) and a second part 66 for engaging the centre bolt 3.

The device may be manufactured from various types of materials; however, aluminium and steel are the preferred materials In the above the invention has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A main module adapted to be attached to a wheel of a vehicle, the main module being configured to be fitted with a protective case for covering a nut or a bolt for attaching the wheel;

wherein the main module comprises:

a centre bolt adapted to be connected to the main module by threading such that the axial position of the centre bolt, as seen along the axis of rotation of the wheel, is adjustable at a time of attaching of the main module to the wheel by rotating the centre bolt relative the main module;

an annular expander adapted to be operably connected to the centre bolt such that the annular expander expands in a radial direction of the wheel as the axial position of the centre bolt is adjusted at the time of attaching of the main module to the wheel, such that the annular expander engages with the wheel and thereby secures the module to said wheel; and a locking mechanism adapted to be arranged in a locking state in which the locking mechanism prevents the centre bolt from rotating relative the main module, and in an open state in which the locking mechanism allows the centre bolt to rotate relative the main module, wherein the locking mechanism comprises an axial recess formed in the centre bolt;

a detachable socket having a through hole and being adapted to be rotationally secured to the main module; and a detachable locking bolt adapted to be inserted into the main module via the through hole and the axial recess; and the axial recess and the through hole are configured to be aligned with each other, and the locking bolt is adapted to prevent the centre bolt from rotating relative the socket.

2. The module according to claim 1, wherein the expander comprises a plurality of segments, and wherein each of the segments is movable in the radial direction so as to engage the module to the wheel.

3. The module according to claim 1, wherein the expander further comprises a retaining means configured to pull the segments towards a centre of the expander.

4. The module according to claim 1, wherein the expander comprises a material configured to be compressed elastically in the axial direction and to expand elastically in the radial direction as the axial position of the centre bolt is adjusted.

5. The module according to claim 2, wherein:
the centre bolt comprises a conical portion; and
each of the segments of the expander comprises a tapered surface portion configured slide against the conical portion as the centre bolt moves in the axial direction, thereby causing each segment to move in the radial direction.

6. The module according to claim 1, wherein the expander is configured to secure the module by exerting a force on the wheel in the radial direction.

7. The module according to claim 1, wherein the expander is configured to secure the module by engaging a shoulder of the wheel, thereby exerting a force on the wheel in the axial direction.

8. The module according to claim 1, wherein the detachable socket comprises recesses and protrusions configured to engage with corresponding recesses and protrusions of the main module.

9. The module according to claim 8, further comprising a locking socket adapted to be rotationally secured to the main module, the locking socket comprising a through hole adapted to receive a locking bolt, and recesses and protrusions configured to engage with corresponding recesses and protrusions of the detachable socket.

10. The module according to claim 1, wherein the locking bolt comprises a key hole and is operable by turning a key in the lock.

11. The module according to claim 1, wherein the locking bolt is configured to be inserted via a front side of the module and secured in the axial direction by engaging a back side of the module.

* * * * *